(12) United States Patent
Kilper

(10) Patent No.: US 8,003,955 B2
(45) Date of Patent: Aug. 23, 2011

(54) SAMPLE MANIPULATION DEVICE

(75) Inventor: Roland Kilper, Jena (DE)

(73) Assignee: Roland Kilper, Jena (DE)

( * ) Notice: Subject to any disclaimer, the term of this patent is extended or adjusted under 35 U.S.C. 154(b) by 219 days.

(21) Appl. No.: 12/092,624

(22) PCT Filed: Sep. 29, 2006

(86) PCT No.: PCT/EP2006/009457
§ 371 (c)(1),
(2), (4) Date: Oct. 7, 2008

(87) PCT Pub. No.: WO2007/054161
PCT Pub. Date: May 18, 2007

(65) Prior Publication Data
US 2009/0078885 A1 Mar. 26, 2009

(30) Foreign Application Priority Data
Nov. 8, 2005 (DE) .......................... 10 2005 053 669

(51) Int. Cl.
*G21K 5/10* (2006.01)
(52) U.S. Cl. .................. 250/442.11; 250/306
(58) Field of Classification Search .................... None
See application file for complete search history.

(56) References Cited

U.S. PATENT DOCUMENTS

| | | | |
|---|---|---|---|
| 4,893,886 A | 1/1990 | Ashkin et al. | |
| 4,907,158 A | 3/1990 | Kettler et al. | |
| 5,071,241 A * | 12/1991 | Brock | 359/390 |
| 5,270,552 A * | 12/1993 | Ohnishi et al. | 250/307 |
| 5,333,495 A * | 8/1994 | Yamaguchi et al. | 73/105 |
| 5,348,883 A | 9/1994 | Togawa | |
| 5,504,340 A * | 4/1996 | Mizumura et al. | 250/492.21 |
| 5,576,542 A * | 11/1996 | Kaga | 250/310 |
| 5,656,811 A * | 8/1997 | Itoh et al. | 850/43 |

(Continued)

FOREIGN PATENT DOCUMENTS

DE 37 18 066 A1 12/1988

(Continued)

OTHER PUBLICATIONS

Suzuki, Akihiro, et al, "Automated Micro Handling," *Proceedings 2003 IEEE International Symposium on Computational Intelligence in Robotics and Automation*, Jul. 16-20, 2003, pp. 348-353, Kobe, Japan.

*Primary Examiner* — Phillip A Johnston
*Assistant Examiner* — Andrew Smyth
(74) *Attorney, Agent, or Firm* — Patterson Thuente Christensen Pedersen P.A.

(57) ABSTRACT

A sample manipulation device comprises an observation unit, which is used to observe a sample and to select a target position at which a portion to be removed from the sample is located, and a specimen stage which receives the sample. The sample manipulation device may include a manipulation tool, which is spatially shiftable relative to the observation unit and comprises a manipulation tip by which portions are removed from the sample, a control unit, which controls the shifting of the manipulation tool, as well as an optical position measurement unit, which is connected to the control unit and is used to determine the actual position of the manipulation tip, so that specific shifting of the manipulation tip to the target position can be carried out.

17 Claims, 2 Drawing Sheets

U.S. PATENT DOCUMENTS

| | | | |
|---|---|---|---|
| 5,689,109 A | 11/1997 | Schütze | |
| 5,854,487 A * | 12/1998 | Braunstein et al. | 850/9 |
| 5,886,684 A * | 3/1999 | Miura et al. | 345/161 |
| 5,935,507 A * | 8/1999 | Morito et al. | 264/482 |
| 5,952,651 A * | 9/1999 | Morito et al. | 250/251 |
| 5,986,264 A * | 11/1999 | Grunewald | 250/310 |
| 6,057,546 A * | 5/2000 | Braunstein et al. | 850/15 |
| 6,184,867 B1 * | 2/2001 | Kandogan et al. | 345/161 |
| 6,188,068 B1 * | 2/2001 | Shaapur et al. | 850/8 |
| 6,310,342 B1 * | 10/2001 | Braunstein et al. | 850/2 |
| 6,538,254 B1 * | 3/2003 | Tomimatsu et al. | 250/442.11 |
| 6,781,125 B2 * | 8/2004 | Tokuda et al. | 850/1 |
| 6,815,664 B2 * | 11/2004 | Wang et al. | 250/251 |
| 6,821,484 B1 | 11/2004 | Gregersen | |
| 6,927,391 B2 * | 8/2005 | Tokuda et al. | 850/10 |
| 7,205,554 B2 * | 4/2007 | Tokuda et al. | 250/492.1 |
| 7,205,560 B2 * | 4/2007 | Tokuda et al. | 250/492.3 |
| 7,220,973 B2 * | 5/2007 | Yu et al. | 250/442.11 |
| 7,227,140 B2 * | 6/2007 | Skidmore et al. | 250/307 |
| 7,444,817 B2 * | 11/2008 | Ito | 60/650 |
| 7,530,795 B2 * | 5/2009 | Ito | 417/209 |
| 2003/0054355 A1 * | 3/2003 | Warthoe | 435/6 |
| 2004/0084426 A1 | 5/2004 | Okada | |
| 2004/0209382 A1 * | 10/2004 | Wakatsuki et al. | 436/177 |
| 2005/0174085 A1 * | 8/2005 | Yuri | 318/640 |
| 2006/0011867 A1 * | 1/2006 | Kidron et al. | 250/492.21 |
| 2006/0011868 A1 * | 1/2006 | Kidron et al. | 250/492.22 |
| 2006/0179992 A1 | 8/2006 | Kermani | |
| 2006/0194334 A1 * | 8/2006 | Zhang | 436/172 |
| 2006/0252054 A1 * | 11/2006 | Lin et al. | 435/6 |
| 2007/0194225 A1 * | 8/2007 | Zorn | 250/306 |

FOREIGN PATENT DOCUMENTS

| | | |
|---|---|---|
| DE | 43 00 698 A1 | 7/1994 |
| DE | 692 10 753 T2 | 10/1996 |
| DE | 103 00 091 A1 | 7/2004 |
| EP | 0 564 273 A1 | 10/1993 |
| EP | 0 577 084 A2 | 1/1994 |
| EP | 1 367 868 A1 | 12/2003 |
| EP | 1 470 863 A1 | 10/2004 |
| EP | 1 502 649 A1 | 2/2005 |
| EP | 1 564 575 A1 | 8/2005 |
| EP | 1564575 A1 * | 8/2005 |
| WO | WO 99 28725 | 6/1999 |

* cited by examiner

SAMPLE MANIPULATION DEVICE

The present application is a National Phase entry of PCT Application No. PCT/EP2006/009457, filed Sep. 29, 2006, which claims priority from German Application Number 102005053669.7, filed Nov. 8, 2005, the disclosures of which are hereby incorporated by reference herein in their entirety.

BACKGROUND OF THE INVENTION

1. Field of the Invention

The invention relates to a sample manipulation device, which comprises an observation unit, which is used to observe a sample and to select a predetermined position at which a sample portion to be removed is located, as well as a specimen stage which receives the sample. The invention relates to difficulties in handling which occur when a sample is being observed while simultaneously carrying out manipulations on the sample which are monitored via the observation unit.

2. Background

In medical, biological and biochemical research, problems involving experiments with individual cells are gaining more and more importance. An important example thereof is the analysis and clarification of molecular regulating mechanisms or so-called molecule cascades. For this purpose, the cell of interest is detached from the cell array and transferred to a nutrient solution which is suitable to keep the cell alive. If conditions are favorable, the initial cell reproduces until sufficient material for the intended analytical method is present; so-called cell lines are prepared. A considerable disadvantage of the method of preparing cell lines is that the starting cell and the cells descending from this cell encounter idealized environmental conditions. However, analytical results obtained in this way do not represent the conditions actually present in the organism.

Neurobiological problems, too, can not be resolved, or resolved only insufficiently, in this manner. For example, after a certain period of time, a neuron isolated from a network of neuronal cells no longer represents that cell which it formerly represented when a part of the neural network. Presently no method is known by which the state of the cell within the network can be preserved with simultaneous reproduction.

On the other hand, biochemical problems can be addressed if sensitive analytical methods are used for which small amounts of material—in particular individual cells—are sufficient. This requires individual cells to be removed from the sample and transferred to an analyzing apparatus within a certain time. This is the only way to ensure that degradation processes within cells have not decomposed the substances to be examined and requires specific removal of an individual, identified, selected cell. One possibility of identification is the utilization of morphologic differences which can be determined by means of microscopy. Another possibility of identification consists in the use of dyes. These dyes can be visualized by fluorescence microscopy and thus enable identification of those cells which are marked with this dye.

In the prior art, there are presently several possibilities of removing individual cells from a sample. One method involves manual preparation, during which the experimenter observes the sample through a stereo microscope and removes individual cells from the sample by mechanical tools. However, this method is complex, time-consuming, and requires the experimenter to have an above average dexterity which is usually acquired only after many years. Another possibility of preparation consists in microdissection, in which UV lasers, for example, are used for cutting. However, this type of preparation requires tissue sections which do not represent living cells. Moreover, inverted microscopes must be used, i.e., the required manual preparation, on the one hand, and the observation, on the other hand, are effected from opposite directions towards the specimen. Although this can be avoided by consecutively using a stereo microscope, then an inverted microscope. The latter method is highly prone to error, due to the continually repeated changing of the microscopes.

SUMMARY OF THE INVENTION

Therefore, it is an object of the invention to improve a sample manipulation device of the above-mentioned type such that the preparation and manipulation of individual cells is simplified, as well as a simpler method, less prone to errors, for removing portions from a sample.

This object is achieved in a sample manipulation device of the above-described type by providing a manipulation tool, which is shiftable in space relative to the observation unit and comprises a manipulation tip by which portions are removed from the sample, a control unit by which the shifting of the manipulation tool is controlled, as well as an optical position measurement unit connected to the control unit, said optical position measurement unit being used to determine the actual position of the manipulation tip so that specific shifting of the manipulation tip towards the target position can be carried out.

Thus, an experimenter observes the sample in the observation unit and selects a portion to be removed from the sample. Such selection may be effected, for example, by guiding the sample portion to be removed into the center of the visual field of the observation unit. Such guiding may be facilitated by crosshairs arranged at the center of the visual field. The portion of the sample in the crosshairs corresponds to the target position. Another possibility results if the image of the sample is represented, for example, on a screen and a corresponding region in the image is selected using a computer mouse or the like. The control unit can then move the manipulation tip of the manipulation tool to the corresponding target position. However, this requires knowledge of the present actual position of the manipulation tip. The optical position of the measurement unit serves to determine the actual position of the manipulation tip. The manipulation tip is moved manually or automatically into the visual field of the position measurement unit, then moved further until it is detected by the position measurement unit. Since the position measurement unit and the observation unit, with their respective coordinate systems, are fixedly positioned relative to each other, the coordinates determined by the optical position measurement unit in its coordinate system can be transformed into the coordinates of the observation unit. In this manner, the three-dimensional distance vector from the manipulation tip to the target position is obtained and a corresponding adjustment can be performed.

In this invention, the position measurement unit may be provided with an image-recording and image-processing unit. This allows the process of coordinate determination and transformation to be performed automatically, if the image-processing unit is also connected to the control unit. The image-processing unit is capable of recognizing by itself when the manipulation tip is in focus.

In an advantageous, space-saving manner, the specimen stage is arranged between the observation and position measurement units. In this case, the manipulation tip is located on the side of the observation unit. Accordingly, the optical properties of the specimen stage may be taken into account when determining the position of the manipulation tip. It is also possible to arrange the observation and position measurement units on the same side of the specimen stage. Moreover, the specimen stage is advantageously shiftable relative to the observation and position measurement units, in particular within the plane of the stage, so that the sample can be displaced within said plane.

Advantageously, the observation and position measurement units are each provided as microscopes, their magnification resulting in higher precision. The position measurement unit can be designed to be shiftable along its optical axis.

In one embodiment of the invention, the optical axes of the objectives of the observation and position measurement units are parallel to each other. The plane of the specimen stage is then conveniently perpendicular to these optical axes. This facilitates the construction of the device. However, designs in which the optical axes are not parallel to each other are also possible. In this case, the position measurement unit and the observation unit, for example, are arranged on the same side of the specimen stage and the optical axes are not parallel to each other. However, the position measurement and observation units can be arranged such that the optical axes intersect, for example, in a point on the specimen stage. In this case, as also in the case where the optical axes are not only parallel to each other, but coincide, laser-optical tools and/or laser-optical measurement units can be advantageously included in the device. These tools and/or measurement units can then be coupled into the object plane by the objective of the position measurement unit. Examples of such tools are optical tweezers or a laser scalpel. The shiftability along the optical axis the focus to be changed. Thus, for example, laser scalpel can be used to cut tissue sections out of the sample, parallel to the plane of the stage and at different heights measured from the plane of the stage.

The tools of this invention need not necessarily be incorporated in the sample manipulation device, but can be coupled in from outside, for example via fibre ports. Such coupling can result in a more cost effective device. Accordingly, special tools, such as a laser microtome, can be easily coupled in the manner of modules.

The position measurement unit may include an objective having a depth of focus on the order of magnitude of the manipulation tip. This ensures that the error of surveying the tip is as small as possible, without increasing the amount of time required as would be the case with an objective having a lower depth of focus. The manipulation tool may be advantageously designed such that the manipulation tip, which may be, for example, a capillary for removal of cells, can be replaced.

In another embodiment of the invention, the manipulation tool including the control unit is omitted. Instead of an optical position measurement unit, an optical manipulation unit is provided, by which a selected portion of the sample can be manipulated. The optical assemblies may be substantially identical with those of the position measurement unit, but the image-recording and image-processing unit can be omitted. The specimen stage can also be arranged between the observation and manipulation units and is advantageously shiftable with respect to the observation and manipulation units. Advantageously, the observation and manipulation units may be each provided as microscopes and the manipulation unit is advantageously shiftable along its optical axis. The optical axes of the objectives of both units may be parallel to each other or may coincide. Additionally, any combination of both designs is conceivable, i.e., the optical manipulation unit may be designed such that it can perform the functions of the optical position measurement unit.

The manipulation unit may comprise laser-optical tools and/or laser-optical measurement devices, which may be, for example, optical tweezers (forceps).

In all embodiments, an incident-light microscope or a stereo microscope, for example, may be provided as the observation unit. Moreover, an image-recording and image-processing unit may be provided in the observation unit. CCD arrays or CMOS arrays are examples of such image-recording units. In the case of a stereo microscope, such an image-recording unit may be coupled to only one of the two channels or to both channels. In this case, the image contains the sum of the intensities of both channels. It is also possible to combine two CCD arrays or CMOS arrays in an image-recording unit in the case of a stereo microscope. This will allow stereo images to be generated.

The invention further relates to a method of removing portions from samples, wherein particularly also the aforementioned sample manipulation devices can be used. In such a method, a target position, at which a sample portion to be removed is located, is selected by an observation unit. Next, the actual position of a manipulation tip relative to the observation unit is determined using an optical position measurement unit, the manipulation tip is moved to the target position, and the sample portion is removed. The sample portion removed can then be deposited again at a predetermined position.

The actual position is preferably determined in that the manipulation tip is first guided by the control unit into the beam path of the position measurement unit such that the contours of the manipulation tip are recognizable for the position measurement unit. Next, focusing on the tip is effected in several steps; then, the coordinates of the manipulation tip in the coordinate system of the observation unit are determined on the basis of the set parameters. The distance vector between the target position and the actual position in the coordinate system of the observation unit then allows to determine the required adjustment for moving to the target position.

BRIEF DESCRIPTION OF THE DRAWINGS

The invention will be explained below with reference to an exemplary embodiment. In the respective drawings.

DETAILED DESCRIPTION OF THE DRAWINGS

Figure 1:
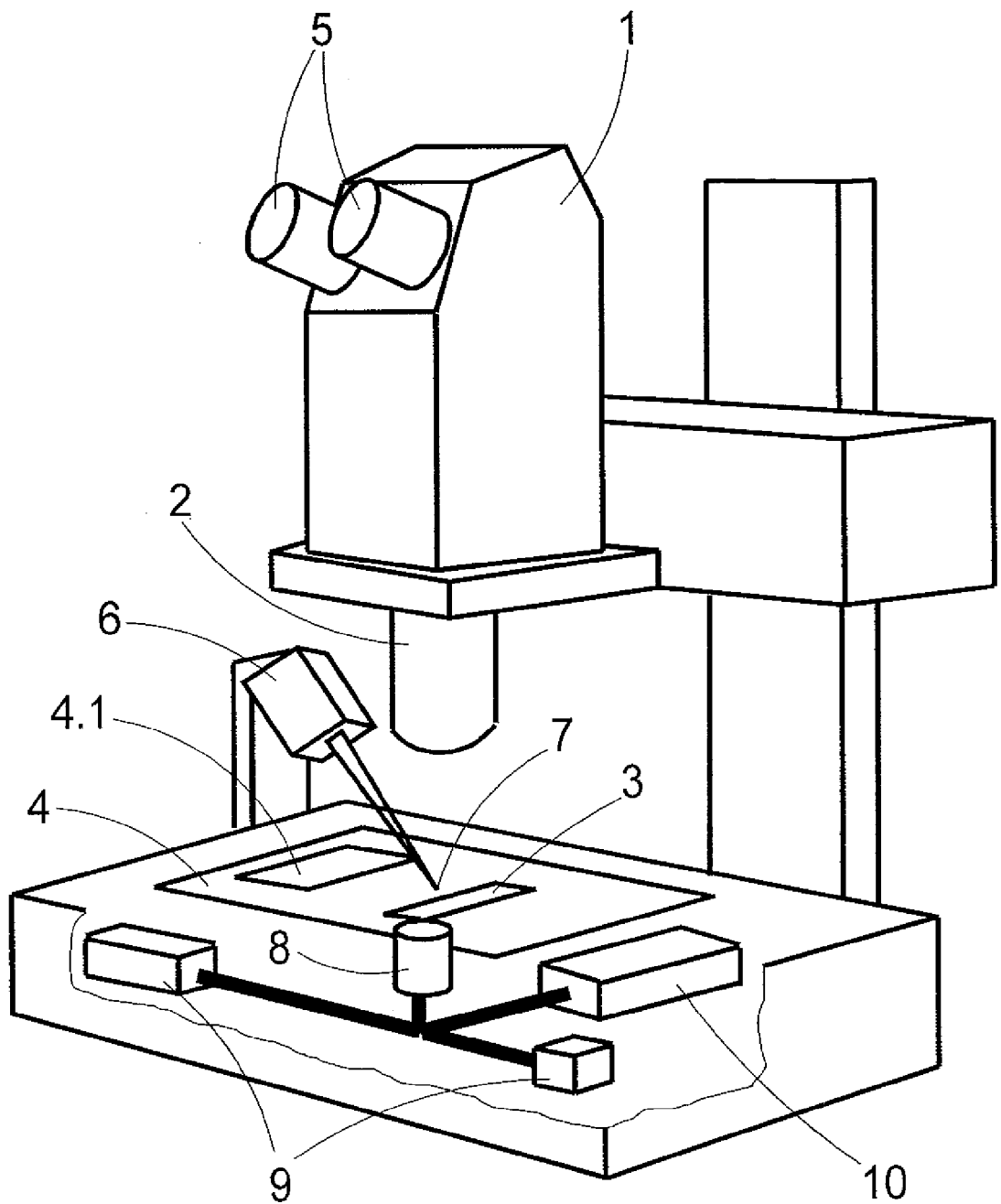
FIG. 1 shows a perspective view of a sample manipulation device according to the invention and comprising a manipulation tool.

The sample manipulation device shown in FIG. 1 includes a stereo microscope 1 as the observation unit. The illumination unit for the sample is also incorporated in said stereo microscope 1. Light is incident through the objective 2 of the stereo microscope 1 on a sample 3 which is fixed on a specimen stage 4. Light reflected by the sample 3 is then directed through the objective 2 to the eyepieces 5 of the stereo microscope 1. The specimen stage 4 is displaceable in the plane of the stage, i.e. perpendicular to the optical axis of the objective 2. To the left of the stereo microscope 1, there is a manipulation tool 6 comprising a manipulation tip 7. The manipulation tool 6 is optional; manipulations of the sample can also be performed via the manipulation objective 8. Using the manipulation tool 6 or the manipulation tip 7, portions of the sample 3, for example individual cells, are removed and deposited in a deposition field 4.1. The deposition field 4.1 may be, for example, a metal plate comprising individual points of measurement, a microtiter plate or the like. If necessary, the deposition positions may be predetermined and stored for further use. For example, lasers 9 may be directed onto the sample 3 via the manipulation objective 8. These lasers 9 may function as tools such as optical tweezers or a laser scalpel, but may also perform measurement tasks. If a manipulation tool 6 is present, the manipulation objective 8 also performs another task, namely that of capturing an image of the manipulation tip 7 and imaging it on a CCD camera 10. Using images recorded from different heights, the manipulation tip 7 can be focused in an iterative manner and, thus, its position relative to the observation unit can be determined.

Figure 2:
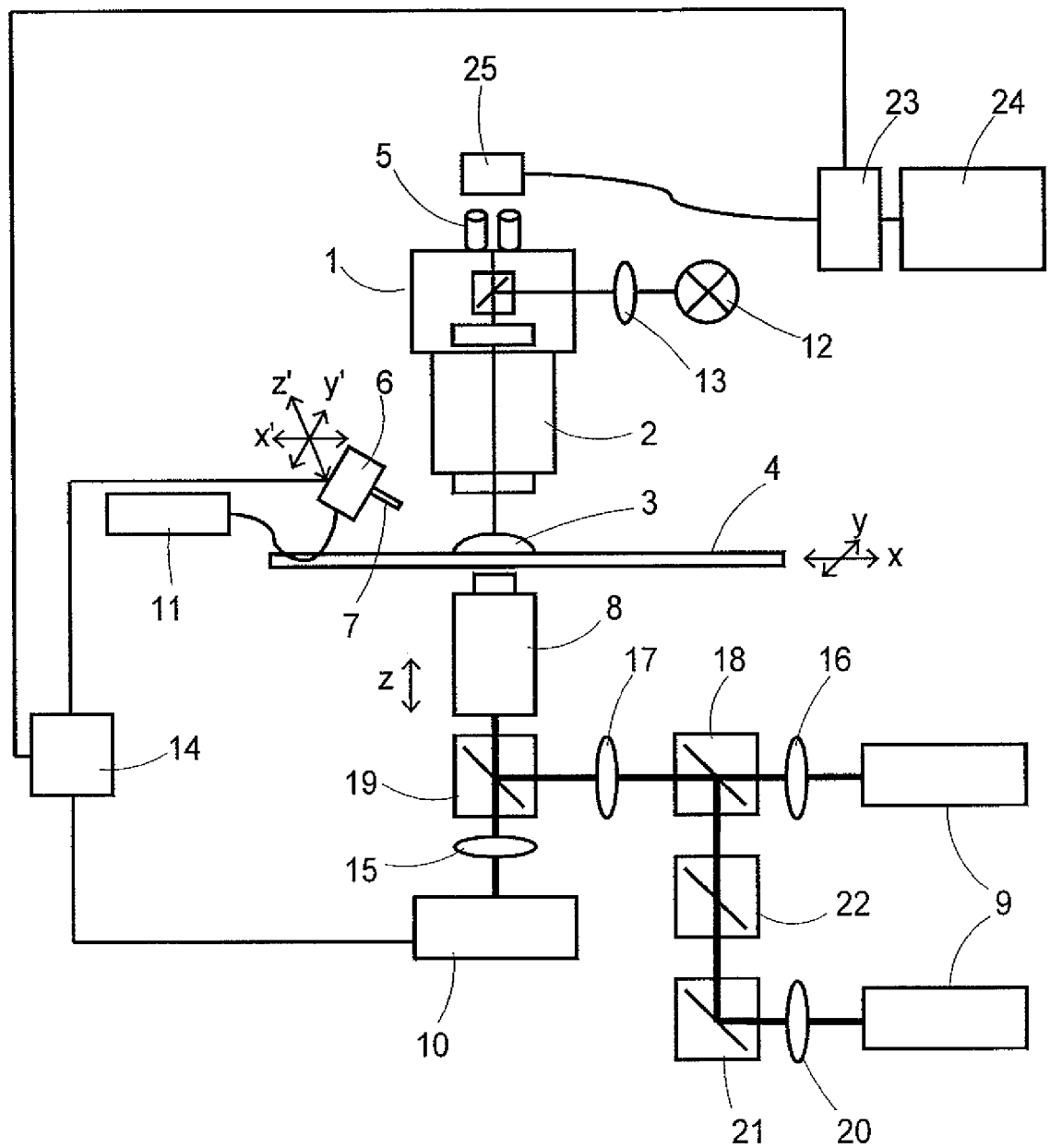
FIG. 2 shows a detailed sketch of the arrangement and cooperation of the individual assemblies.

FIG. 2 shows the individual components of the sample manipulation device. The device comprises a stereo microscope 1 including an objective 2, a motor-adjustable specimen stage 4, on which the sample 3 is fixed, as well as a manipulation tool 6 which can be motor-shifted in the three spatial directions and is provided with a manipulation tip 7. The coordinate system of the manipulation tool 6 is designated by the coordinates x', y' and z'. A suction device 11 for capillaries is connected to the manipulation tool 6. The sample 3 is irradiated by a source of illumination 12, which is coupled into the beam path via a lens 13. Said source may be, for example, a laser which excites fluorescence if the sample 3 is marked using suitable dyes. The specimen stage 4 can shift parts, which are located in the object plane, within this plane, which is referred to as the X-Y plane. The manipulation tool 6 preferably serves to receive a capillary and, as indicated, can be shifted along the three independent axes x', y' and z'. These axes are usually not identical with the axes x, y and z. Below the specimen stage 4, there is the manipulation objective 8, which can be moved in the z-direction, i.e. along the optical axis or perpendicular to the plane of the stage. Sucking up selected particles of tissue requires exact knowledge of the spatial coordinates of the manipulation tip 7.

In cases where the manipulation tip 7 is a capillary, these are exchanged more frequently and their coordinates subsequently have to be determined anew. For determining the coordinates of the tip, the low depth of focus of the manipulation objective 8 can be utilized. A control loop comprising the image of the CCD camera 10, a corresponding image-processing software and the control of the motor-adjustable axes x', y' and z' of the manipulation tool 6 allows the exact spatial location of the manipulation tip 7 to be determined. For the duration of the coordinate determination, the manipulation objective is always at the same z-position, which is known to a control unit 14 which controls the measurement. First, the manipulation tip 7 is moved via the control unit 14 until the image processing, which evaluates the image of the CCD camera 10 and may be integrated in the control unit 14, recognizes the contours of the manipulation tip 7. Then, the control loop becomes effective and the manipulation tool 6 including the manipulation tip 7 is moved via the control unit 14 such that the manipulation tip 7 is sharply imaged onto the CCD camera 10 at the end of the feedback control. Since the imaging conditions of the manipulation objective 8 in combination with the imaging lens 15 are known to the control unit, the z coordinate of the manipulation tip 7 in the coordinate system of the stereo microscope can thus be determined. It is also possible to determine the x and y coordinates via the location of the manipulation tip 7 within the image recorded by the CCD camera 10. Advantageously, the control loop may also be configured such that the manipulation tip 7 is located at the center of the image at the end of the procedure. If parts of the manipulation tool 6 are located within the focal depth range of the manipulation objective 8 already during the search for the contours of the manipulation tip 7, this may also be utilized to move the tool so that the manipulation tip 7 is sharply imaged at the end of the feedback control. The axes of the manipulation tool 6 may then be adjusted, for example, electromechanically.

Using a capillary with an angled tip clamped such that it is rotatable about its axis, the angular position may be determined as well, so that the tip can be rotated to the appropriate angle in each case. This can be uniquely achieved by determining the position of the tip at various angular positions—either by adjustment and simultaneous focusing or by rotating and then searching. The positions, which may be located on the circumference of a circle, allow determination of the center of said circle. In application, an angled capillary has advantages, because it can be fixed almost parallel to the object plane, thus providing a better sensitively for heights, for example, during transfer from optical tweezers. In order to deposit the removed sample portion, the capillary is then rotated such that its opening points downwards.

Laser-optical tools may also be provided in addition to or instead of the manipulation tool 6. In FIG. 2, two lasers 9 are provided, respectively emitting light at different wavelengths. The upper of the two lasers 9 functions as a so-called laser scalpel, its radiation being coupled, via the beam shaper 16, the lens 17 and the beam splitters 18 and 19, into the manipulation objective 8 and, from there, into the object plane. The lower of the two lasers 9 functions as so-called optical tweezers. Its light is coupled, via a beam shaper 20, a deflecting mirror 21, a scanning unit 22, the beam splitter 18, the lens 17, and the beam splitter 19, into the manipulation objective 8 and, from there, into the object plane. By means of the scanning unit 22, the optical tweezers can be freely moved within the visual field of the manipulation objective 8. The stereo microscope 1, the specimen stage 4, the movement of the manipulation objective 8 along the z-direction as well as the movement of the manipulation tool 6 can also be controlled centrally by a separate unit. Said unit may be, for example, a PC 23, which is connected to a screen 24. The control unit 14 may also be integrated into this PC 23, but may be connected to the latter. For example, the microscope image recorded by a CCD camera 25 as well as the locations of the laser-optical tools can be displayed on the screen 24 of the PC 23.

In a further embodiment of the invention, at least some of the individual steps, but preferably each step, from observation via selection to preparation, recording and transfer through discharge of the particle of tissue, can be precisely documented, to which end the CCD camera 25 makes the essential contribution. The positions at which the removed cell or the tissue particle is to be deposited can be predetermined and stored, also depending on the sample. This is advantageous, in particular, where tissue particles are removed from many different samples and need to be unmistakably identified later, e.g. in forensic medicine.

In the laser-optical tools, a so-called spatial light modulator (SLM) may also be provided instead of a scanning unit 22. Said modulator allows to realize also a multiplicity of optical tweezers, basically even so-called multi-beam tweezers.

The invention claimed is:
1. A sample manipulation device, comprising
an observation unit which is used to observe a sample and to select a target position at which a portion to be removed from the sample is located,
a specimen stage which receives the sample, a manipulation tool, which is spatially shiftable relative to the observation unit and comprises an exchangeable manipulation tip by which said portion is removed from said sample, a control unit which controls the shifting of the manipulation tool; and an optical position measurement unit which is connected to the control unit, wherein the position measurement unit and the observation unit are each provided as microscopes, the specimen stage being arranged between the observation unit and the optical position measurement unit and the position measurement unit comprising an objective having a depth of focus on the order of magnitude of the manipulation tip; and wherein the position measurement unit is used to determine the actual position of the manipulation tip so that specific shifting of the manipulation tip to the target position can be carried out by the control unit.

2. The sample manipulation device as claimed in claim 1, further comprising an image-recording and image-processing unit provided in the position measurement unit.

3. The sample manipulation device as claimed in claim 1, wherein the specimen stage is shiftable relative to the observation and position measurement units.

4. The sample manipulation device as claimed in claim 1, wherein the position measurement unit is shiftable along its optical axis.

5. The sample manipulation device as claimed in claim 1, wherein the optical axes of the objectives of the observation and position measurement units are parallel to each other.

6. The sample manipulation device as claimed in claim 5, wherein the optical axes coincide.

7. The sample manipulation device as claimed in claim 1, further comprising laser-optical tools coupled into the object plane by the objective of the position measurement unit.

8. The sample manipulation device as claimed in claim 1, wherein a stereo microscope or an incident-light microscope is provided as the observation unit.

9. A sample manipulation device, comprising an observation unit, which is used to observe a sample and to select a portion to be manipulated, a specimen stage which receives the sample, and an optical manipulation unit, by which the selected portion can be manipulated, said specimen stage being arranged between the observation and manipulation units and said manipulation unit being provided as a microscope, wherein a stereo microscope is provided as the observation unit.

10. The sample manipulation device as claimed in claim 9, wherein the specimen stage is shiftable relative to the observation and manipulation units.

11. The sample manipulation device as claimed in claim 9, wherein the manipulation unit is shiftable along its optical axis.

12. The sample manipulation device as claimed in claim 9, wherein the optical axes of the objectives of the observation and manipulation units are parallel to each other.

13. The sample manipulation device as claimed in claim 12, wherein the optical axes coincide.

14. The sample manipulation device as claimed in claim 9, wherein the manipulation unit comprises laser-optical tools.

15. The sample manipulation device as claimed in claim 1, further comprising an image-recording unit and an image-processing unit provided in the observation unit.

16. The sample manipulation device as claimed in claim 1, further comprising laser-optical measurement devices coupled into the object plane by the objective of the position measurement unit.

17. The sample manipulation device as claimed in claim 9, wherein the manipulation unit comprises laser-optical measurement units.

* * * * *